(12) United States Patent
Ramaraj et al.

(10) Patent No.: US 8,949,413 B2
(45) Date of Patent: Feb. 3, 2015

(54) FILTER SELECTION AND RESUSE

(75) Inventors: Balamurugan Ramaraj, San Jose, CA (US); Gopi Krishna, Union City, CA (US); Ananda Sathyanarayana, Santa Clara, CA (US); Apurva Mehta, Cupertino, CA (US); Krishna Sankaran, Milpitas, CA (US); Murtuza Attarwala, San Francisco, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 280 days.

(21) Appl. No.: 13/174,216

(22) Filed: Jun. 30, 2011

(65) Prior Publication Data

US 2013/0007257 A1 Jan. 3, 2013

(51) Int. Cl.
G06F 15/173 (2006.01)
H04L 29/06 (2006.01)

(52) U.S. Cl.
CPC ........... H04L 63/0263 (2013.01); *H04L 63/102* (2013.01)
USPC ........... 709/224; 709/220; 709/221; 709/223; 709/225; 709/232

(58) Field of Classification Search
CPC ..................... H04L 41/0816; H04L 41/0846
USPC .................. 709/220, 221, 223, 224, 225, 232
See application file for complete search history.

(56) References Cited

U.S. PATENT DOCUMENTS 6,574,666 B1 6/2003 Dutta et al.
6,826,698 B1* 11/2004 Minkin et al. ................. 726/1
7,945,691 B2* 5/2011 Dharamshi ................ 709/232
8,301,741 B2* 10/2012 Kulasingam et al. ......... 709/223
8,345,688 B2* 1/2013 Zhou et al. .................... 370/392

(Continued)

FOREIGN PATENT DOCUMENTS

CN 101753542 A 6/2010
EP 0856974 A2 8/1998

OTHER PUBLICATIONS

"3GPP TS 23.401—General Packet Radio Service (GPRS) enhancements for Evolved Universal Terrestrial Radio Access Network (E-UTRAN) access," version 10.0.0, 3rd Generation Partnership Project, Technical Specification Group Services and Systems Aspects, Jun. 2010, 261 pp.

(Continued)

*Primary Examiner* — Thanh Tammy Nguyen
*Assistant Examiner* — Jonathan Bui
(74) *Attorney, Agent, or Firm* — Shumaker & Sieffert, P.A.

(57) ABSTRACT

In general, techniques are described for selectively applying and reusing filters stored in a router. In one example, a method includes receiving a network access request from a first user. The method also includes selecting a candidate rule group associated with the packet flow, wherein the candidate rule group comprises one or more currently deployed rules of an existing rule group on the computing device that are currently installed within a forwarding plane and are being applied by the forwarding plane to network traffic associated with a second user. The method also includes installing a new rule group comprising the one or more currently deployed rules of the existing rule group and one or more new rules associated with the first user and not currently installed within a forwarding plane. The method also includes applying each rule of the new rule group to network traffic associated with the first user.

33 Claims, 8 Drawing Sheets

(56) References Cited

U.S. PATENT DOCUMENTS

| | | | |
|---|---|---|---|
| 2005/0276262 A1* | 12/2005 | Schuba et al. | 370/389 |
| 2005/0278431 A1* | 12/2005 | Goldschmidt et al. | 709/207 |
| 2006/0013136 A1* | 1/2006 | Goldschmidt et al. | 370/235 |
| 2007/0185887 A1* | 8/2007 | Wadsworth et al. | 707/100 |
| 2007/0239648 A1* | 10/2007 | Thota | 706/47 |
| 2008/0154830 A1* | 6/2008 | Gschwind et al. | 706/47 |
| 2008/0282336 A1 | 11/2008 | Diaz Cuellar et al. | |
| 2008/0289026 A1* | 11/2008 | Abzarian et al. | 726/11 |
| 2009/0182689 A1* | 7/2009 | Chiles et al. | 706/12 |
| 2009/0327198 A1* | 12/2009 | Farah | 706/47 |
| 2010/0005074 A1* | 1/2010 | Endacott et al. | 707/3 |
| 2010/0011433 A1* | 1/2010 | Harrison et al. | 726/12 |
| 2010/0037289 A1* | 2/2010 | Roy et al. | 726/1 |
| 2011/0022722 A1* | 1/2011 | Castellanos Zamora et al. | 709/235 |
| 2011/0060713 A1* | 3/2011 | Harrison et al. | 706/47 |
| 2012/0180104 A1* | 7/2012 | Gronich et al. | 726/1 |
| 2012/0204220 A1* | 8/2012 | Lavi | 726/1 |

OTHER PUBLICATIONS

"3GPP TS 36.300—Evolved Universal Terrestrial Radio Access (E-UTRA) and Evolved Universal Terrestrial Radio Access Network (E-UTRAN) Overall Description," Released 10, 3rd Generation Partnership Project, Technical Specification Group Radio Access Network, Jun. 2010, 183 pp.

"3GPP TS 23.203—Policy and charging control architecture (Release 10)," Version 10.1.0, 3rd Generation Partnership Project, Technical Specification Group Services and System Aspects, Sep. 2010, 132 pp.

Liu, "Efficient Mapping of Range Classifier into Ternary-CAM," in the Proceedings of the 10th Symposium on High Performance Interconnects (HOTI), Aug. 21-23, 2002, pp. 95-100.

Lakshminarayanan, "Algorithms for Advanced Packet Classification with Ternary CAMs," SIGCOMM'05, Aug. 21-26, 2005, 12 pp.

Gupta, "Packet Classification on Multiple Fields," Abstract, Jun. 7, 1999, 14 pp.

Extended European Search Report mailed Oct. 1, 2012 in corresponding EP Application No. 12173034.5, 6 pgs.

Notification of the First Office Action and Search Report, and translation thereof, from Counterpart Chinese Patent Application No. 2012102132966, dated Aug. 18, 2014, 15 pp.

\* cited by examiner

FILTER SELECTION AND RESUSE

TECHNICAL FIELD

The invention relates to computer networks and, more particularly, to techniques for filtering data within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices within the network, such as routers, maintain routing information that describes routes through the network. Each route defines a path between two locations on the network. From the routing information, the routers may generate forwarding information, which is used by the routers to relay packet flows through the network and, more particularly to relay the packet flows to a next hop. In reference to forwarding a packet, the "next hop" from a network router typically refers to a neighboring device along a given route. Conventional routers often maintain the forwarding information in the form of one or more forwarding tables. Upon receiving an incoming packet, the router examines information within the packet to identify the destination for the packet. Based on the destination, the router forwards the packet in accordance with one of the forwarding tables.

The routers may further apply packet filters to packet flows through the routers. For example, the router may compare header information within the packet to a set of filtering rules, sometimes referred to as "terms". The filtering rules may specify, for example, particular source IP address, destination IP addresses, and other criteria for filtering packets. Specifically, the router identifies packets from the packet flows that match the filtering rules, and performs an associated action on the packet depending on which filtering rule the packet matched. The action may include dropping the packet, remarking the packet as lower priority, counting packets that match the filtering rule, and the like. For example, the router may drop packets having a source IP address of a device sourcing a denial of service (DoS) attack by applying a filtering rule for the source IP address dropping any packets matching the filter rule. Conventional routers typically apply the filters to packet flows based on the interfaces from with the flows are received, i.e., on an interface-by-interface basis. For instance, the router may apply an interface-specific filter to each of the packet flows received by a given interface. Alternatively, the routers may apply a single packet filter to all packet flows regardless of the interface from which the packet.

SUMMARY

In general, the invention is directed to techniques for selectively applying and reusing filters stored in a router. A router, for example, may receive packets originating from access networks via multiple interfaces, and apply one or more filters to the packets. Each filter may define how the router will classify the packets packets based on the contents of the packet. In some examples, multiple filters may be applied to a stream of packets. In some environments, a router may manage and route traffic originating from millions of users. In such examples, each user may be associated with a set of filters. Based on different services provided to different users, e.g., bandwidth, quality of service, etc., different filter sets may be applied to packets originating from different users. As the quantity of users increase, the quantity of filters that must be managed and applied by a router may also increase substantially. Since there is only limited amount of filtering resources available in hardware, it may not be practical to implement the filters required for the individual user traffic. To reduce storage and processing requirements, aspects of the present disclosure provide techniques for sharing sets of filters to minimize redundant filter storage. For instance, a router may not store a set of filters required for a user, if there is an identical set in hardware that is used by another user. Instead, the router may reuse that existing filter set, and if needed, even add additional filters to the existing set. In this way, the number of filters stored by the router may be reduced by sharing filters. Moreover, techniques of the present disclosure provide set management schemes using multiple data structures to manage the relationships between the shared filter supersets and subsets. Such techniques of the present disclosure may enable a router to quickly identify filters sets while reducing processing and storage requirements of the router.

In one example, a method includes receiving, by a computing device, a network access request from a first user. The method also includes selecting, by the computing device, a candidate rule group associated with the packet flow, wherein the candidate rule group comprises one or more currently deployed rules of an existing rule group on the computing device that are currently installed within a forwarding plane of the computing device and are being applied by the forwarding plane of the computing device to network traffic associated with a second user. The method also includes installing, by the computing device, a new rule group comprising the one or more currently deployed rules of the existing rule group and one or more new rules associated with the first user and not currently installed within the forwarding plane of the computing device. The method also includes applying, by the computing device, each rule of the new rule group to network traffic associated with the first user.

In another example, a network device comprises one or more network interfaces to receive network access request from a first user. The network device also includes a manager module that detects the first packet flow, wherein the manager module selects a candidate rule group associated with the packet flow, wherein the candidate rule group comprises one or more currently deployed rules of an existing rule group on the computing device that are currently installed within a forwarding plane of the computing device and are being applied by the forwarding plane of the computing device to network traffic associated with a second user. The manager module also installs a new rule group comprising the one or more currently deployed rules of the existing rule group and one or more new rules associated with the first user and not currently installed within the forwarding plane of the computing device. The manager module also applies each rule of the new rule group to network traffic associated with the first user.

The details of one or more embodiments of the invention are set forth in the accompanying drawings and the descrip-

DETAILED DESCRIPTION

Figure 1:
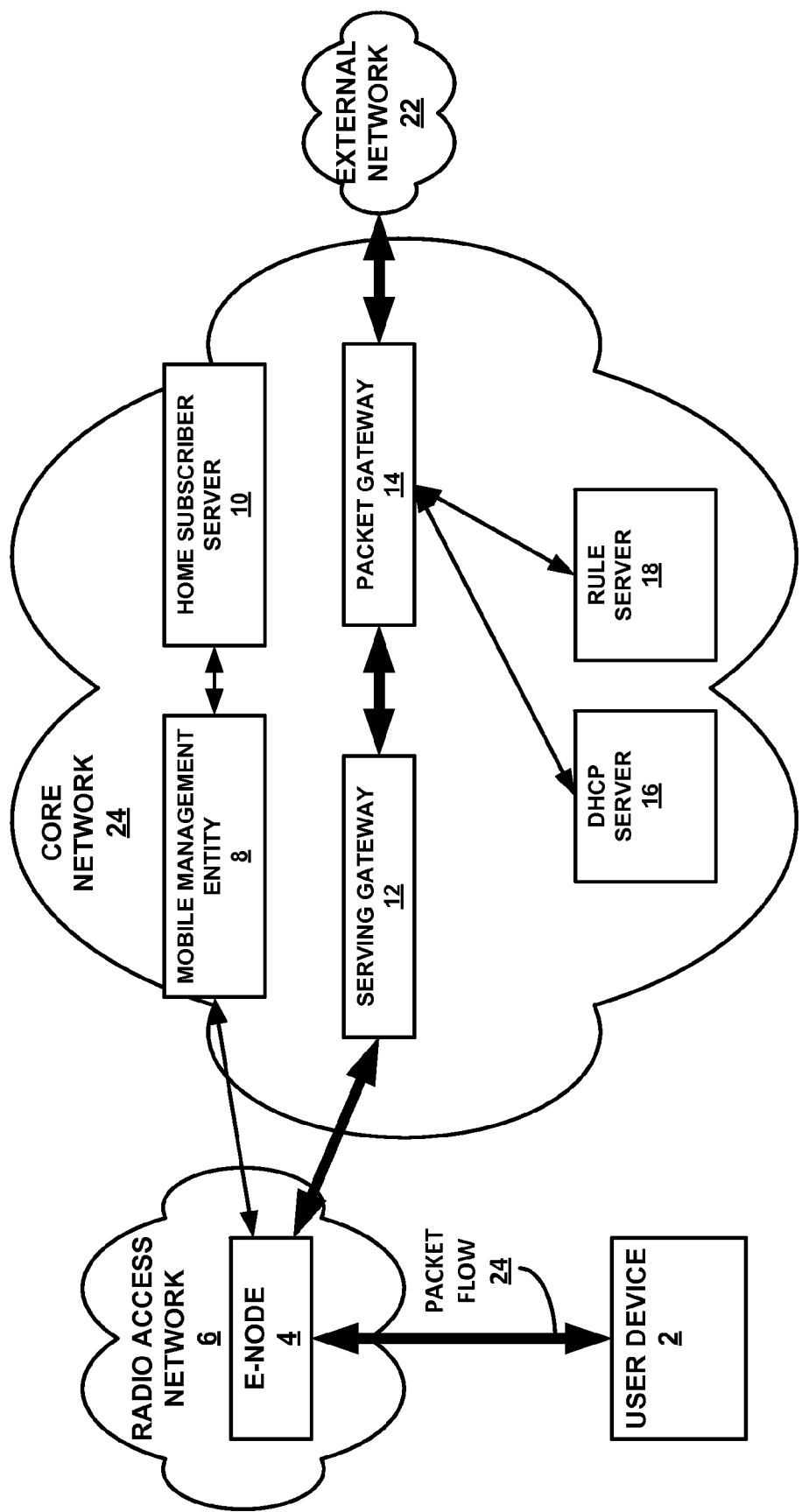
FIG. 1 is a block diagram illustrating an example of a user device that connects to an external network via a radio access network and core network, in accordance with the techniques of this disclosure.

FIG. 1 is a block diagram illustrating an example of a user device 2 that connects to an external packet-based network 22 (e.g., the Internet) via a radio access network 6 and core network 24. A shown in FIG. 1, user device 2 may be any computing device. For instance, user device 2 may be a portable computing device (e.g. mobile phone/netbook/laptop/tablet device) or a desktop computer having cellular and/or other radio frequency communication capabilities. User device 2 may connect to e-node 4 via radio access network 6 using wireless communications hardware included in user device 2 such as a 3G, 4G or LTE radio compliant components.

E-node 4 includes hardware, such as a radio frequency transmitter, that communicates directly with wireless communications hardware included in user device 2. The radio frequency transmitter facilitates the communication of data from user device 2 to e-node 4. E-node 4 in some examples also includes a radio network controller. The radio network controller of e-node 4 provides radio resource management of radio access network 6. Radio resource management may include system level control of co-channel interference, managing transmission power, channel allocation, data rates, handover criteria, modulation scheme, error coding scheme. In this way, radio network controller may utilize limited radio spectrum resources and the infrastructure of radio network 6 in an efficient manner.

E-node 4 provides user device 2 with access to a radio access network 6. Radio access network 6 serves as an access network that enables user device 2 to transmit data to core network 24. User device 2 connects radio network 6 via a radio channel provided e-node 4. User device 2 further communicates data via radio network 6 using various well-known multiplexing schemes such as frequency division multiplex (FDM), time division multiplex (TDM), code division multiplex (CDM), and space division multiplex (SDM). Data received from user device 2 at e-node 4 is further transmitted to core network 24.

Core network 24 includes any type of network capable of transmitting data, such as a layer three (L3) packet-switched network operating over one or more layer two (L2) networks (e.g., an Ethernet or multi-packet label switching (MPLS) network) that may be used to transmit data from radio access 6 to networks such as the Internet 22. Core network 24, in some examples, is comprised of network elements that represent any communication devices such as switches, routers, links, and other devices capable of transmitting data. Core network 24 may manage access and communication of data from user device 2 to other external networks 22 such as the Internet. Core network 24 establishes and operates bearers to transport user traffic, in the form of "packets." In general, a bearer is a set of network resources and data transport functions in core network 24 to deliver user traffic between two network entities. A bearer may include a path, a logical connection, or a physical or wireless connection between two network devices. A bearer may comprise, for example, an Evolved Packet System (EPS) bearer.

Further details regarding bearer setup and management are found in "3GPP TS 23.401—General Packet Radio Service (GPRS) enhancements for Evolved Universal Terrestrial Radio Access Network," version 10.0.0, 3rd Generation Partnership Project, Technical Specification Group Services and System Aspects, June 2010, and 3GPP TS 36.300—Evolved Universal Terrestrial Radio Access (E-UTRA) and Evolved Universal Terrestrial Radio Access Network Evolved Universal Terrestrial Radio Access Network (E-UTRAN) Overall Description," Release 10, 3rd Generation Partnership Project, Technical Specification Group Radio Access Network, 2010, the entire contents of each being incorporated herein by reference.

Components of core network 24 may provide various services such as packet routing, quality of service, user device authentication, billing/charging, and policy enforcement. Components of core network 24 include mobile management entity (MME) 8, home subscriber server (HSS) 10, serving gateway 12, packet gateway 14, dynamic host configuration protocol (DHCP) server 16, and rule server 18. Components of core network 24 may be implemented in any combination of hardware and or software and may be interconnected via core network 24.

As shown in FIG. 1, MME 8 receives data communications from e-node 4. MME 8 is responsible for a variety of functions to facilitate connectivity between user device 2 and core network 24. For instance, MME 8 typically assigns unique identifiers to each user device connected to radio access network 6. Examples of unique identifiers may include tunnel identifiers or Internet Protocol (IP) addresses. MME 8 is also responsible for authenticating user devices on core network 24. For example, MME 8 may receive one or more authentication credentials from user device 2. MME 8 may verify the authentication credentials are authentic by querying HSS 10 or other AAA device. HSS 10 includes a centralized database that includes subscription and user-related data including authentication data. HSS 10 further includes data for mobility management, and call and session establishment support. If the authentication credentials are not authentic, MME 8 may deny user device 2 access to external network 22.

As shown in FIG. 1, components of core network 24 may further include serving gateway 12. Serving gateway 12 in some examples, routes and forwards user data packets received from user device 2. Serving gateway 12 may also serve as a mobility anchor when user device 2 transitions from one e-node 4 to another. For example, as a user moves away from a first location that includes e-node 4 and closer to a second location that includes a second, different e-node, user device 2 may switch connections from e-node 4 to the second e-node. In this way, user device 2 may seamlessly switch between different radio access networks without interrupting the user device session. Although user device 2 may switch between radio access networks, serving gateway 12 manages data communications received from user device 2 via the various, different e-nodes.

Core network 24 may further include packet gateway 14. Packet gateway 14 provides connectivity for data communication from user device 2 to external network 22. Packet gateway 14 may provide a variety of functions including policy enforcement, packet filtering for each user, and packet screening. To provide such functionality, packet gateway 14 may further communicate with other components of core network 24 such as DHCP server 16 and rule server 18. DHCP server 16 may provide automatic configuration of Internet Protocol (IP) addresses for user device 2.

In some examples, user device 2 attaches to core network 24, which establishes a core network session and a default bearer to carry user traffic for the wireless device as part of an attach procedure. In some examples, user device 2 may send a network access request to serving gateway 12. The network access request may be data that includes a device identifier of user device 2 or a credential that identifies the user such as a user name or other unique identifier. The network access request may enable serving gateway 12 to provide user device 2 with access to core network 24 and external network 22 via the core network session. The core network session is an association between core network 24 and user device 2 that is identifiable by a combination of a user device 2 address and an Access Point Name (APN) for external network 22. The core network session may provide for transport of user traffic between user device 2 a destination device connected to external network 22. Besides establishing a default bearer, the attach procedure may trigger establishment, by core network 24, of one or more dedicated bearers between packet gateway 14 and user device 2 to carry user traffic. Dedicated bearers operate according to a different set of quality of service (QoS) parameters and thus provide QoS differentiation to packet flows of various services engaged by user device 2. For example, various dedicated bearers may provide different guaranteed bit rates (GBR bearers) (or may not provide a guaranteed bit rate), maximum bit rates (MBRs), priority, packet delay budget, packet error loss rate, and allocation and retention priority (ARP) characteristics. A particular bearer may transport packet flows for multiple service sessions of a core network session when the QoS characteristics of the bearer match the requirements of the service sessions. In an IP-based content access network 4, a core network session comprises an IP-core network session.

Packet gateway 14 implements policy and charging control (PCC) functionality for core network 4. An operator and/or an external entity, such as a Policy and Charging Rules Function entity, e.g., rule server 18, provisions packet gateway 14 with one or more PCC rules that each specify a set of information enabling the detection of a service data flow and providing policy control and/or charging control parameters. PCC rules may include one or more filters. Packet gateway 14 enforces service flow-based policy and charging control according to the PCC rules. Further details regarding policy and charging control are found in "3GPP TS 23.203—Policy and Charging Control Architecture (Release 10)," Version 10.1.0, 3rd Generation Partnership Project, Technical Specification Group Services and System Aspects, September 2010, which is incorporated herein by reference in its entirety.

A PCC rule includes a rule identifier that uniquely identifies the rule within a session, service data flow detection information, charging information, and/or policy control information. Generally, a session may include a tunnel existing between user device 2 and packet gateway 14. Policy control information specifies parameters for gating control (i.e., permit/deny), QoS control, and QoS signaling. Service data flow detection information includes a precedence value and a service data flow template that specifies traffic mapping information to identify packet flows for a service session. Traffic mapping information may include one or more packet filters that include parameters that characterize packet flows according to, for example, the IP 5-tuple consisting of the source address, destination address, source port, destination port, and transport protocol specified in IP packet headers, other packet header information, and/or information obtained from Deep-Packet Inspection (DPI). The set of packets detected by applying the service data flow template of a particular PCC rule are referred to as a service data flow. A service data flow may include packets for multiple service sessions. Packet filters of a service data flow template may be alternatively referred to herein as service data flow filters.

Packet gateway 14 associates service data flows (and, by extension, the corresponding PCC rule) to particular bearers for a core network session during a binding process to ensure that packet flows within the services data flows receive an appropriate QoS from core network 24. For a given PCC rule, packet gateway 14 analyzes policy control information therein to determine whether an existing bearer for the relevant core network session is sufficient to provide the requisite QoS. If not, packet gateway 14 initiates establishment of a new, suitable bearer. Packet gateway 14 creates bindings between (or "binds") one or more service data flows and the bearer that matches the QoS specified in corresponding PCC rules for the service data flows. A particular bearer established to provide a particular QoS scheme may thus carry packet flows matched by one or more PCC rules.

Packet gateway 14 evaluates service data flow templates of corresponding PCC rules for application to packets traversing the core network 24 boundary. During evaluation of a packet, matching a packet filter in a service data flow template for a PCC rule causes packet gateway 14 to map the packet to the bearer to which the PCC rule is bound.

In accordance with the techniques of this disclosure, to ensure a specified level of service across core network 24 in both the downlink and uplink directions, packet gateway 14 applies packet filters that include the same traffic mapping information as that found in a traffic template traffic mapping information. Packet filters may be included in rules stored on a rule server 18. Rule server 18 may include rules associated with users of core network 24. A rule may include one or more filters or filters sets that may be applied to a packet flow. In one example, a packet flow may be described as user traffic. In some examples, a set of filters when applied to a bearer may be referred to as a Traffic Flow Template (TFT). Different policies may be defined for different users and/or different packet flows. For example, different policies may be defined for various types of subscriber services. In some examples, filters may be applied to provide higher quality of service, which the user may pay for in higher subscriber fees. In other examples, filters may be used to enforce parental controls or provide priority to different types of packet flow such as multimedia, data, or voice.

Figure 2:
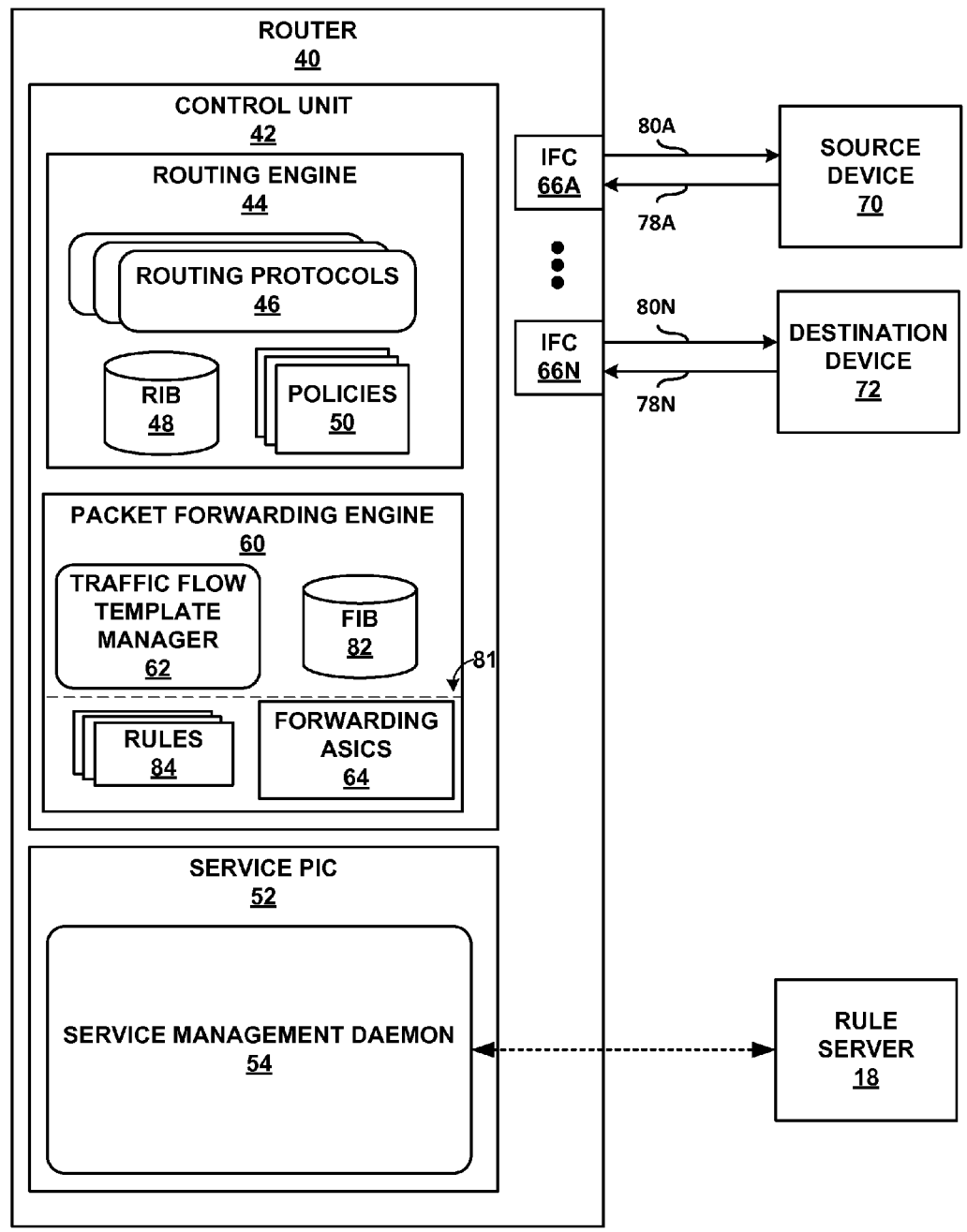
FIG. 2 is a block diagram illustrating an example router that is configured in accordance with one or more techniques of this disclosure.
Figure 3:
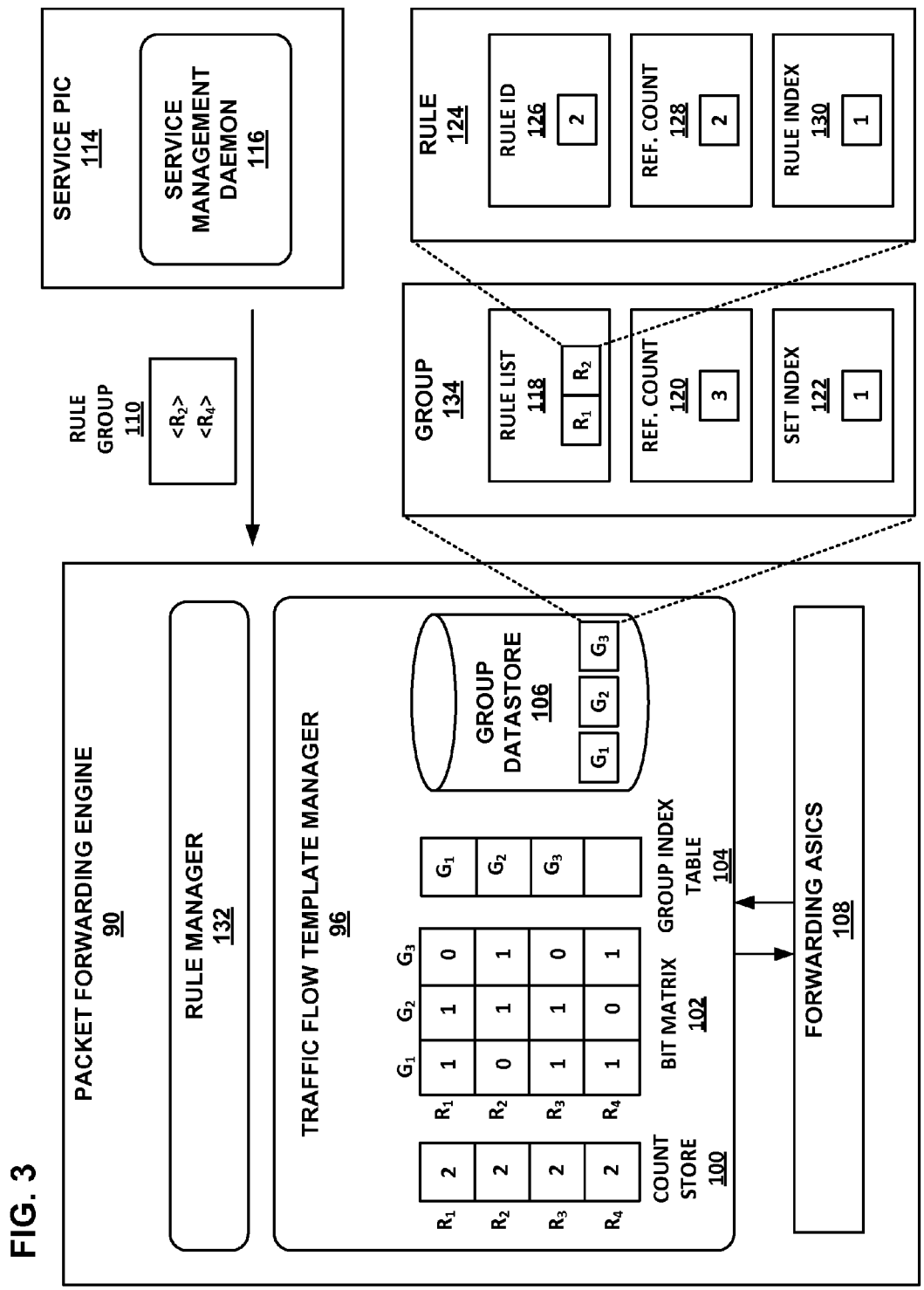
FIG. 3 is a block diagram illustrating an example packet forwarding engine configured in accordance with one or more techniques of this disclosure.

More generally, packet gateway 14, in some examples, identifies packets associated with different subscribers and handles such packets differently based on filters associated with a subscriber. For example, packet gateway 14 may examine packet headers of a packet flow. In one example, packet gateway 14 may inspect the source and destination port, protocol, and source and destination IP address of a packet, e.g., a five-tuple. Based on the header contents and the filters applied by packet gateway 14, packets may be dropped, re-prioritized, modified or allowed to continue to a destination specified in the header. FIGS. 2 and 3 further describe functionality of packet gateway 14.

As shown in FIG. 1, user device 2 may send and receive data packets that comprise packet flow 26. In one example, packet gateway 14 may initially determine that packet flow 26 originates from user device 2 and that user device 2 is associated with a particular user. Packet gateway 14 may therefore select one or more policies from rule server 18 that are associated with the user. The one or more policies may include one or more filters. Packet gateway 14 may apply the set of filters to packet flow 26. In some examples, as the quantity of subscribes increase to millions, substantial resources of packet gateway 14 are used to store and select the filters for each user. Aspects of the present disclosure provide techniques for sharing filters in packet gateway 14. In such examples, rules that include filters may be further grouped into rule groups. A datastore of rule groups on packet gateway 14 may be maintained such that exact sets, supersets, and subsets of a requested rule group may be shared between subscribers (users). By further maintaining a data structure such as a bitmap on packet gateway 14 to identify requests for exact sets or subsets stored in the searchable database, filter selection time and storage requirements of packet gateway 14 may be reduced. When configuring a forwarding plane of packet gateway 14 to support a newly connected mobile device (e.g., user device 2), the techniques described herein may reuse existing filters that are already installed within the forwarding plane for processing packet flows for connected users to minimize duplicate storage of filters and therefore improve storage efficiency and resource consumption.

FIG. 2 is a block diagram illustrating an example router 40 that is configured in accordance with one or more techniques of this disclosure. For purposes of illustration, router 40 may be described below within the context of packet gateway 14 shown in the example of FIG. 1. For example, router 40 may represent an example implementation of packet gateway 14 of FIG. 1. In this example embodiment, router 40 includes control unit 42 and interface cards 66A-66N (collectively "IFCs 66").

Router 20 typically include a chassis (not shown in the example of FIG. 2 for ease of illustration purposes) having a number of slots for receiving a set of cards, including IFCs 66 and service physical interface cards (service PICs) such as service PIC 52. Each card may be inserted into a corresponding slot of a chassis for communicably coupling the card to a control unit 42 via a bus, backplane, or other electrical communication mechanism. IFCs 66 send and receive packet flows or network traffic via inbound network links 78A-78N (collectively, "inbound links 78") and outbound network links 80A-80N (collectively, "outbound links 80"). Inbound links 78 and outbound links 80 form common, physical communication media for the IFCs, which operate in full duplex mode. That is, in some examples, each of IFCs 66 is coupled to respective communication media that can send and receive data substantially simultaneously. In other examples, inbound links 78 and outbound links 80 form separate physical media for respective IFCs 66.

Control unit 42 may include one or more processors (not shown in FIG. 2) that execute software instructions, such as those used to define a software or computer program, stored to a computer-readable storage medium (again, not shown in FIG. 2), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 42 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Routing engine 44 of control unit 42 may provide the routing functionality of router 40. In this respect, routing engine 44 may represent hardware or a combination of hardware and software of control unit 42 that implements routing protocols 46. Routing protocols 46 may include, for example, intermediate system to intermediate system (IS-IS), open shortest path first (OSPF), routing information protocol (RIP), border gateway protocol (BGP), or other routing protocols. By executing routing protocols 46, routing engine 44 identifies existing routes through the network and determines new routes through the network. Routing engine 44 stores routing information within routing information base (RIB) 48. The routing information may include information defining a topology of a network, such as core network 24 of FIG. 1. Routing engine 44 may resolve the topology defined by the routing information to select or determine one or more routes through core network 24.

Routing engine 44 may then update packet forwarding engine (PFE) 60 in accordance with these routes to PFE 60 with forwarding information stored within forwarding information base (FIB) 82. The forwarding information associates keying information, e.g., IP addresses or IP prefixes or labels with next hops (e.g., neighboring routers) and ultimately with output interfaces of router 40 coupled to outbound links 80. When forwarding a packet, data plane 34 processes a key extracted from the packet's header to traverse the forwarding information stored in FIB 82 and selects a next hop to which to forward the packet. Based on the selected next hop, PFE 60 identifies the set of one or more outbound links 80 that are coupled to the next hop.

Prior to forwarding a packet via one or more outbound links 80, PFE 60 may apply one or more filters to the packet. As illustrated in FIG. 2, PFE 60 includes Traffic Flow Template (TFT) manager 62 (also referred to herein as "manager module"), forwarding information base 82 and a forwarding plane 81 provided by forwarding application specific integrated circuits (ASICs) 64 configured to apply filters 84 installed therein. Rules 84 include one or more filters defined for one or more different network address prefixes. In some examples, filters specify one or more conditions and a set of actions to be performed on packets that match the network address prefixes. The actions may include one or more of appending a label to the packet, removing or swapping a label on the packet, inspecting the packet for viruses, performing deep packet inspection on the packet, performing quality of service processing on the packet, blocking or dropping the packet or other services. A set of filters in some examples may be referred to as a Traffic Flow Template.

PFE 60 programs forwarding (ASICs) 64 of PFE 60 in accordance with forwarding constructs specified within forwarding information base (FIB) 82, which associates network destinations with specific next hops and corresponding interface ports. Forwarding ASICs 64 may comprise one or more dedicated packet forwarding integrated circuits. In some examples, forwarding ASICs 64 are programmed by TFT manager 62 with one or more filters included messages received Service Management Daemon 54. Forwarding ASICs 64 may apply the filters to packets in a packet flow based on characteristics of the packet flow, e.g., 5-tuple information.

As shown in FIG. 2, PFE 60 further includes TFT manager 62. TFT manager 62 performs various functions including policy selection/enforcement and packet flow detection. For instance, in the case of policy selection/enforcement, a source device 70 may communicate data to and from destination device 72 via router 40. Source device 70, in some examples, may represent mobile user device 2 as shown in FIG. 1 and destination device 72 may represent a computing device or resource on external network 22 of FIG. 1.

When a source device 70 is assigned to router 40 (i.e., "attaches" to the router), a core network session and default bearer are established to carry user traffic for the wireless device as part of an attach procedure. As described in FIG. 1, a core network session is an association between a core network that includes router 40 and, e.g., source device 70 that is identifiable by a unique identifier such as a combination of a source device 70 address and an Access Point Name (APN) for an external network. The unique identifier may be referred to as a subscriber identifier. In addition to establishing a default bearer, the attach procedure may trigger establishment, by the core network, of one or more dedicated bearers between router 40 and source device 70 to carry user traffic.

As part of the attach procedure, PFE 60 initially receives control information including the subscriber identifier of source device 70 from one or more components of core network 24. In some examples, the control information is received in header information of control packets received from a user device. In other examples, control information may be received from MME 8 of FIG. 1. PFE 60 sends the control information to service management daemon (SMD) 54 executing on a service physical interface card (service PIC) 52. SMD 54 selects filters identified by the control information, e.g., subscriber identifier, which may be sent in messages to TFT manager 62. In some examples, one or more filters may be grouped in a rule and one or more rules may further be grouped in a rule group. TFT Manger 62 may use the message information to modify forwarding ASCIs 64 in accordance with the selected filters to install the filters and construct a forwarding path for packet flows associated with the subscriber.

In some examples, when selecting filters associated with a subscriber identifier, SMD 54 may request the rules from rule server 18, which may be a Policy and Charging Rules Function entity. For example, rule server 18 may maintain mappings of rules to subscriber identifiers. For example, a particular subscriber identifier may be associated with one or more PCC rules (also referred to as "rules" hereinafter) that specifies specific charging requirements, quality of service, intercept information or other actions to apply based on specific criteria. In one example, a rule includes up to 16 filters, hash values corresponding to the individual filters, and rule hash value of all the filters included in the rule. The hash value of all the filters included in the rule may be a unique rule identifier. Once SMD 54 has selected one or more rules corresponding to the subscriber identifier, SMD 54 may generate a message including the one or more rules and hash values that is sent to TFT manager 62.

As shown in FIG. 2, TFT manager 62 receives the message including rule information from SMD 54. In some examples, PFE 60 stores the rules in a group datastore 106 as shown in FIG. 3. Upon receiving the message, TFT manager 62 may select the one or more filters included in rules 84 and a microkernel executing within a processor of PFE 60 programs the forwarding ASICs in accordance with the filters. In this way, the attach procedure as described in FIG. 2, configures PFE 60 to provision forwarding plane 81 to provide a level of service defined by the rules associated with a particular subscriber identifier.

As previously described in FIG. 1, router 40 (e.g., packet gateway 14 of FIG. 1) may service packet flows for millions of subscribers. As the number of subscribers increases, storage resources of PFE 60 may be consumed by filters programmed in hardware for each subscriber. In some examples, storage resources may include high-speed storage such as Reduced-Latency Dynamic Random Access Memory (RLDRAM) or Ternary Content Addressable Memory (TCAM). Such high-speed storage may have limited storage capacity and in some cases is costly. Techniques of the present disclosure as further described in FIG. 3 may reuse existing filters in PFE 60, i.e., filters already installed within forwarding plane 81 for existing packet flows of currently connected subscribers, to minimize duplicate storage of filters for newly connected subscribers and, therefore, improve storage efficiency.

FIG. 3 is a block diagram illustrating an example PFE 90 including a rule manager 132, TFT manager 96, and forwarding ASICs 108 configured in accordance with one or more techniques of this disclosure. As shown in FIG. 3, PFE 90 may be PFE 60 as shown in FIG. 2. PFE 90 further includes TFT manager 96, rule manager 132, and forwarding ASICs 108. FIG. 3 also includes service PIC 114 connected to PFE 90. Service PIC 114 includes SMD 116.

As part of an attach procedure as described in FIG. 2, SMD 116 executing on service PIC 114 receives a subscriber identifier, e.g, from PFE 90 or another PFE or control unit within the router. In the attach procedure, PFE 90 detect a packet flow comprising one or more packets of the subscriber. Upon receiving the subscriber identifier, SMD 116 selects one or more rules associated with the subscriber identifier from, e.g., rule server 18 as shown in FIG. 2. In some examples, a subscriber identifier may be associated with a group of rules. SMD 116 generates a message that includes the selected rules associated with a subscriber identifier, e.g., rule group 110, and sends the message to PFE 90.

PFE 90, as shown in FIG. 3, includes rule manager 132, an expanded view of TFT manager 96, and forwarding ASICs 108. To implement techniques of the present disclosure that reduce rule storage redundancy in PFE 90, TFT manager 96 implements data structures including count store 100, bit matrix 102, group index table 104, and group datastore 106. Bit matrix 102 may be implemented as an N×N multi-dimensional array, e.g., a 2×2 array as shown in FIG. 3. Bit matrix 102 is used to track rules included in each rule group. For example, bit matrix 102 as shown in FIG. 3 indicates that group $G_1$ includes rules $R_1$, $R_3$, and $R_4$ as represented by '1' values for rules present in a group and '0' values for rules not included in a group. Bit matrix 102 in some examples is dynamically re-sizable in one or more dimensions to accommodate changes in number of rule groups stored in group datastore 106.

Techniques of the present disclosure use bit matrix 102 to track which groups of rules are presently stored in the hardware, e.g., ternary content-addressable memory (TCAM) of PFE 90. By tracking rules stored in hardware of PFE 90, rule groups may be reused thereby limiting redundant storage of such rules. Techniques of the present disclosure using bit matrix 102 may further realize performance improvements because TFT manager 96 may rapidly search bit matrix 102 to identify rule groups. For instance TFT manager 96 may select a candidate rule group associated with a packet flow of the subscriber. The candidate rule group may include one or more currently deployed rules of an existing rule group of router 40 that are currently installed within a forwarding plane of router 40. A forwarding plane of router 40 may include one or more components such as PFE 90 that perform operations to control whether and/or how packets arriving on an inbound interface are routed to a next destination. In some examples, the rules of the existing rule group are applied by the forwarding plane of the computing device to a second packet flow. TFT manager 96 may install a new rule group in forwarding ASICs 64. The new rule group may include the one or more currently deployed rules of the existing rule group and one or more new rules associated with the first packet flow and not currently installed within the forwarding plane of the computing device. Upon installing the rules of the new rule group, forwarding ASICs 64 may apply each rule of the new rule group to the first packet flow. Further details are described hereinafter.

As shown in FIG. 3, TFT manager 96 includes group index table 104. TFT manager 96 uses group index table 104 to identify the index in bit matrix 102 that corresponds to a rule group. For example, column 0 of bit matrix 102, e.g., index 0, corresponds to group $G_1$. Group index table 104 stores a group index of group $G_1$ at index 0 of group index table 104. A group index of group $G_1$ may include a hash value of the rules included in group $G_1$, or may include any other identifier suitable to identify group $G_1$. TFT manager 96, applying techniques further described herein, uses group indices stored in group index table 104 to request rule groups stored in group datastore 106 and manage bit matrix 102.

TFT manager 96, as shown in FIG. 3, further includes a rule manager 132. Rule manager 132 stores associations between hash values of rules received from SMD 116 and indices in bit matrix 102 that correspond to the rule hash values. For instance, SMD 116, as part of an attach procedure for a mobile user device, may send rule group 110 which specifies rules $R_2$ and $R_4$ to be applied for packet flows associated with the user device. Rules $R_2$ and $R_4$ may each further be comprised of filters. Prior to sending rules $R_2$ and $R_4$, SMD 116 generates hash values of each rule to uniquely identify each rule. SMD 116 further generates a hash value of rule group 110 based on rules $R_2$ and $R_4$ included in rule group 110. When TFT manager 96 receives rule group 110 from SMD 116, TFT manager 96 further receives hash values of rule group 110, rule $R_2$, and $R_4$. TFT manager 96 uses the hash values to identify and select rules tracked in bit matrix 102. In one example, rule manager 132 stores an association between the hash value of rule $R_2$ and the index of bit matrix 102 corresponding to $R_2$, e.g., an index value of 1 corresponding to row index 1 of bit matrix 102. In this way, TFT manager 96 may identify and manage rule indices of bit matrix 102. Rule manager 132 may be implemented as an array, map, or any other suitable data structure.

Figure 4:
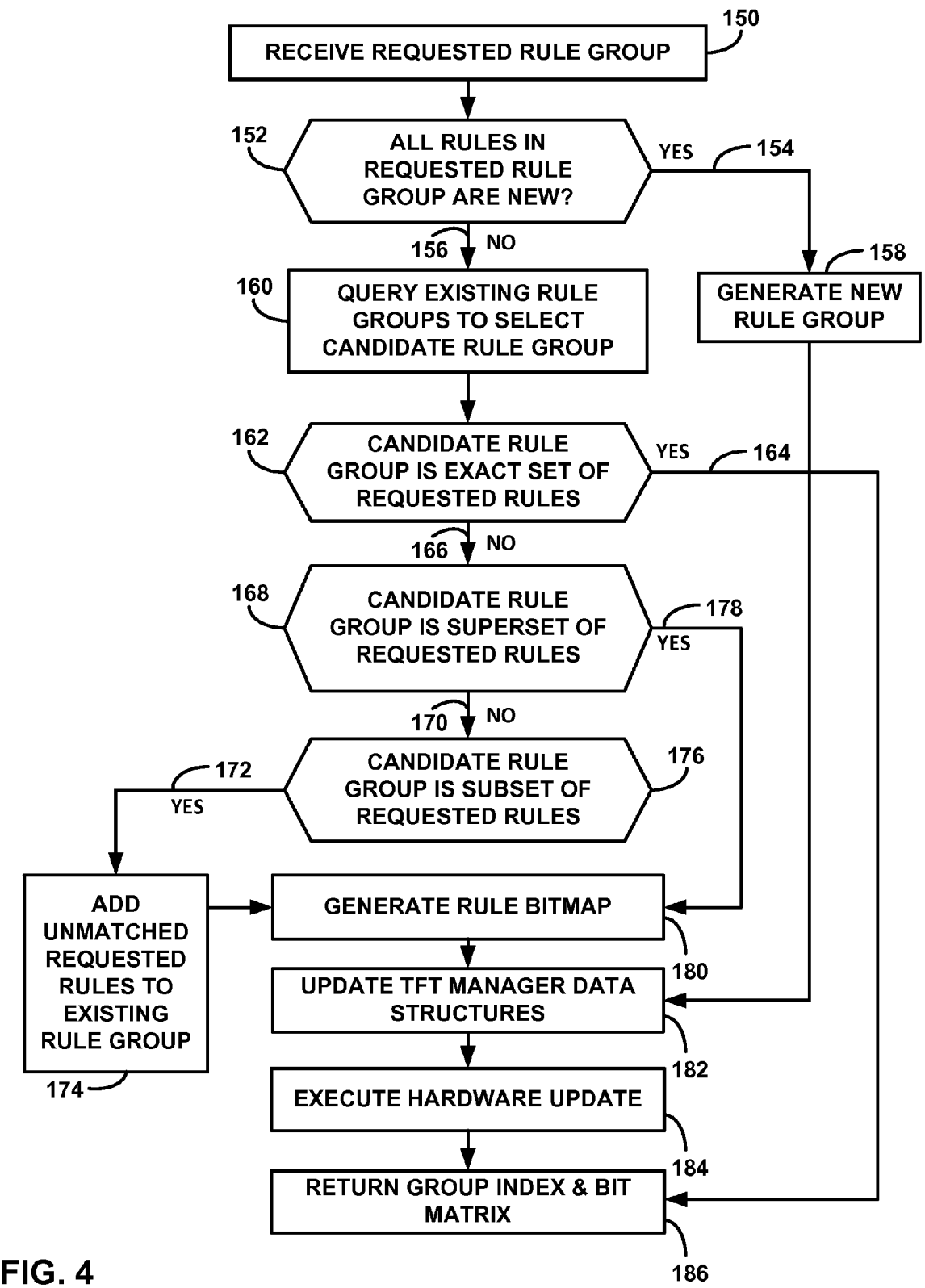
FIG. 4 is a flow chart illustrating an example method to create a group of rules in a packet forwarding engine, in accordance with the techniques of this disclosure.

As shown in FIG. 3, TFT manager 96 further includes count store 100. Because techniques of the present disclosure enable rule sharing by TFT manager 96 to reduce rule storage redundancy, TFT manager 96 further includes count store 100 to determine the number of groups that include a particular rule. As shown in FIG. 3, count store 100 may be implemented as an array such that each index of count store 100 corresponds to a rule. The value stored at each index corresponds to a number of rule groups that reference the rule. The index of count store 100 for a particular rule matches the index of bit matrix 102 for that rule. For instance, rule $R_2$ is associated with index 1 of count store 100 and row index 1 of bit matrix 102. In this way, TFT manager 96 may efficiently determine the number of groups that reference a particular rule as shown in FIG. 4. For example, rule $R_2$ is included in rule groups $G_2$ and $G_3$ and therefore count store 100 stores a value of 2 at index 1 corresponding to rule $R_2$.

As shown in FIG. 3, TFT manager 96 further includes group datastore 106. Group datastore 106 provides storage and retrieval of one or more rule group objects, e.g., rule group 134, that represent differing groupings of the rules. Each rule group is uniquely identifiable in group datastore 106 by a group index. Each rule group may further include one or more rules, e.g., rule 124 that comprise the rule group. In some examples, group datastore 106 is implemented as a linked list of group objects. In such examples, the rule groups are sorted in descending order based on the size of the group, e.g., the number of rules in the rule group. Sorting the rule groups in descending order based on cardinality enables TFT Manager 96 to quickly identify a rule group of currently installed rules that may be reused for an attachment of a new user device using example method described in FIGS. 4-8. Although previously described as a linked list, group datastore 106 may be implemented as any suitable data structure.

As shown in FIG. 3, rule group 134 includes a rule list 118, reference count 120, and set index 122. Rule group 134 may be implemented as an object. Rule group 134 may further include a value indicating the available space for rules and a pointer to hardware specific structure that stores rule group 134. In some examples, rule list 118 is a linked list of rule objects, e.g., rule 124. Rule list 118 may include pointers to rule objects that comprise the rules of rule group 134. Reference count 120 is a value that indicates a number of references to group 134. For example, SMD 116 may receive three unique subscriber identifiers from PFE 90, where each unique subscriber identifier may be associated with a group of rules that includes rules $R_2$ and $R_4$. In this example, SMD 116 may send three rule groups to TFT manager 96 that each include rules $R_2$ and $R_4$. Using techniques described hereinafter, TFT manager 96, for the first rule group, would store a single instance of group 134 in group datastore 106. For the second and third rule groups received, TFT manager 96 uses reference count 120 to track the number of subsequent rule groups sent from SMD 116 to TFT 96 that include a partial, exact, or superset of rules included in group 134. In this way, a rule group may be stored once in group datastore 106 and reused by TFT manager 96 to service subsequent requests to use the same rule group. Reference count 120 will be further described herein in one or more examples of FIGS. 4-8. Rule group 134 may also include a free space counter (not shown) that indicates an amount of free space available in group 134 to store additional rules. As described in later examples, TFT Manager 96 may add one or more rules to a rule group but may use the free space counter to preliminarily determine if the rule group includes available free space to store the rules.

Rule list 118 of rule group 134 specifies one or more rules, an example of which is shown in more detail as rule 124. In some examples, rule 124 is an object that represents a rule. Rule 124 further includes rule identifier 126, reference count 128, and rule index 130. In some examples, rule 124 further includes a pointer to hardware specific structure that stores rule 124 and the filters included in the rule 124. Rule identifier 126 is a value that uniquely identifies rule 126. In some examples, rule identifier 126 is a hash value of rule 124. Rule index 130 is a value indicating the index in bit matrix 102 that corresponds to rule 124 and consequently, the position of rule 124 within rule list 118 of group 134. For instance, row index 1 of bit matrix 102 corresponds to rule $R_2$. Consequently, rule index 130 of rule 124 includes a value of 1. A rule index of 1 further indicates that rule 124 is positioned second in rule list 118.

Rule 124 further includes reference count 128 that, in some examples, is a value that indicates a number of references to rule 124 within a given group, e.g., group 134. For instance, SMD 116 may receive two unique subscriber identifiers. Each unique subscriber identifier may be associated with a group of rules that includes rules $R_2$ and $R_4$. SMD 116 may send two rule groups to TFT manager 96 that each includes rules $R_2$ and $R_4$. Using techniques described hereinafter, TFT manager 96 may maintain a single instance of rule 124 stored in group datastore 106 and use reference count 128 to track the number of subsequent rule groups sent from SMD 116 to TFT 96 that include rule 124. Reference count 128 will be further described herein in one or more examples of FIGS. 4-8.

FIG. 4 is a flow chart illustrating an example method to create a group of rules in PFE 90, in accordance with the techniques of this disclosure. The example method of FIG. 4 may be performed by TFT manager 96 as shown in FIG. 3. Using the example method of FIG. 4, TFT manager 96 may reduce rule storage redundancy by reusing rule groups and reducing the creation of new groups in PFE 90. In some examples of the method, TFT manager 96 receives a rule group from SMD 116 in a message that requests TFT manager 96 to program the rules of the rule group into forwarding ASICs 108. Using the example method, TFT manager 96 returns a group index of a rule group stored by PFE 90 that includes the requested rules sent by SMD 116. The example method further returns a rule bitmap that indicates the positions of each rule in the rule group stored by PFE 90. In some examples, the microkernel of PFE 90 uses the group index and rule bitmap to program rules into forwarding ASICs 108. The example method is described in further detail hereinafter.

Initially, TFT manager 96 receives a requested rule group and a request from SMD 116 to program forwarding ASICs 108 with the rules of the requested rule group (150). To eliminate redundant storage of such rules, TFT manager 96 executes the method of FIG. 4 to determine whether group datastore 106 includes a rule group used to program forwarding ASICs 108 that satisfies the request. In this way, rules stored in group database 106 may be shared and reused.

To determine whether group datastore 106 includes a rule group that satisfies the request, TFT manager 96 checks count store 100 to determine if any existing rule groups in group datastore 106 include one or more rules of the requested rule group (152). If none of the rules in the requested rule group are included in an existing rule group of group datastore 106, all the requested rules are new (154). Consequently, TFT manager 96 generates a new rule group (158).

When generating the new group, TFT manager 96 assigns a unique group index to the new rule group and further stores the new rule group in group datastore 106. The group index may be a hash value of all the rules included in the rule group. TFT manager 96 also updates data structures of TFT manager 96 including count store 100, bit matrix 102, group index table 104 (182). For example, TFT manager 96 associates a rule identifier, e.g., a hash, of each new rule with an index of count store 100. TFT manager 96 further sets each element of count store 100 that corresponds to a new rule to a value of 1 to indicate that the new group references each rule. To update bit matrix 102, TFT manager 96 also associates the new group index with an unused column of bit matrix 102. TFT manager 96 further associates unused row indices of bit matrix 102 with rule identifiers of each new rule. Rule manager 132 stores associations between each new rule identifier and the row index of bit matrix 102 corresponding to the new rule.

When generating the new rule group, TFT manager 96 further sets each row/column intersection of the new group and new rule in bit matrix 102 to a value of 1 to indicate each new rule is included in the new group. TFT manager 96 further stores the unique group index of the new group in group index table 104. The location of the unique group index within group index table 104 corresponds to the column position of the group index in bit matrix 102.

In some examples, TFT manager 96 determines one or more requested rules in the rule group received from SMD 116 are not new, e.g., one or more requested rules are already included in an existing rule group of group datastore 106 (156). As earlier described, TFT manager 96 checks count store 100 to determine if one or more requested rules are included in an existing rule group. If one or more requested rules are included in an existing rule group, TFT manager 96 queries the existing rules groups to select a candidate rule group (160). A candidate rule group is an existing group of rules stored in group datastore 106 that includes at least one rule of the existing rule group. Further details of an example method to query an existing rule group in order to select a candidate rule group are described in FIG. 6.

Upon selecting a candidate rule group, TFT manager 96 determines whether the candidate rule group is an exact set of the requested rules (162). An exact set of rules is an existing rule group wherein the existing rules exactly match the requested rules and the existing rules are stored in the same order as the requested rules. If the candidate rule group is an exact set (164), TFT manager 96 updates count store 100. TFT manager 96 updates count store 100 by incrementing each value corresponding to a requested rule by 1. Incrementing each requested rule by 1 indicates that each existing rule has been referenced by another rule group, e.g., the requested rule group.

In some examples, TFT manager 96 determines the candidate rule group is not an exact set of requested rules (166). In such examples, TFT manager 186 determines whether the selected candidate rule group is a superset of the requested rules. A superset includes existing rules matching all the requested rules and the existing rules are stored in the order of the requested rules. A super set also contains at least one additional existing rule not included in the requested rule group. For instance requested rule group may include rules $R_2$ and $R_4$. A candidate rule group that is a superset of the requested rule group may include $R_2$, $R_3$, and $R_4$. If TFT manager 96 determines the candidate rule group is a superset of the requested rule group (178), TFT manager 96 generates a rule bitmap (180). The rule bitmap indicates the positions of each requested rule within the candidate group. For instance, in the current example of a rule group including rules $R_2$, $R_3$, and $R_4$, a rule bitmap may include the value "101" to indicate that the microkernel of PFE 90 will program requested rules $R_2$ and $R_4$ but not rule $R_3$ into forwarding ASICs 108. In this way, existing rules of a candidate rule group may be reused for the requested rule group rather than creating a new rule group in the hardware of PFE 90. TFT manager 96 then updates TFT manager data structures to reflect the use of the superset (182). For instance, TFT manager 96 increments the reference count value of the existing rule group stored in group datastore 106 to indicate that the existing rule group is referenced by the requested rule group. TFT manager 96 further increments the reference count value of each rule included in the rule group to indicate that each rule is referenced by the requested rule group.

TFT manager 96 may determine in some cases that the candidate rule group is not a superset of the requested rules (170). In such examples, TFT manager 96 determines whether the candidate rule group is a subset of the requested rules (176). A subset includes at least one rule that matches a requested rule. The subset may include a quantity of rules that is greater than or less than the quantity of rules in the requested rule group. In any case, if TFT manager 96 determines that the candidate rule group is a subset of the requested rule group (172), TFT manager 96 adds the unmatched rules of the requested rule group to the existing rule group that current comprises the candidate rule group. In some examples, TFT manager 96 may add the unmatched rules to indices in the beginning or middle of the existing rule group before adding unmatched rules to indices at the end of the existing rule group. TFT manager 96 also generates a rule bitmap (180) after adding the unmatched requested rules to the existing rule group. The rule bitmap indicates the positions of each requested rule within the candidate group.

TFT manager 96 then updates TFT manager data structures to reflect the use of the subset (182). For instance, TFT manager 96 increments the reference count value of the existing rule group stored in group datastore 106 to indicate that the existing rule group is referenced by the requested rule group. TFT manager 96 further increments the reference count value of each rule included in the rule group to indicate that each rule is referenced by the requested rule group. If an unmatched rule is added to the existing rule group, e.g., a subset of the requested rule group, TFT manager 96 associates an unused index of bit matrix 102 with a rule identifier of the added unmatched rule. TFT manager 96 assigns a value of 1 to the previously unused index of bit matrix 102 to indicate the rule group includes the newly added unmatched rule. For each unmatched rule added to the existing rule group, TFT manager 96 also associates a rule identifier of the unmatched rule with an unused index of count store 100. TFT manager 96 increments the value at each index of count store 100 that corresponds to a requested rule.

After TFT manager 96 has updated the TFT manager data structures, TFT manager 96 executes a hardware update to program rules from the candidate rule group into forwarding ASICs 108. When TFT manager 96 executes the hardware update, the microkernel of PFE 90 programs the rules into forwarding ASICs 108. The microkernel of PFE 90 initially selects the candidate rule group from group datastore 106. Upon selecting the candidate rule group, the microkernel selects the rules at positions of rules within the rule group specified by the rule bitmap generated by the example method of FIG. 4. The selected rules are programmed into forwarding ASICs 108 by the microkernel. In this way, candidate rules stored by PFE 90 in group datastore 106 are resused and shared to program forwarding ASICs 108 with the requested rules thereby reducing redundant rule storage in PFE 90.

TFT manager 96, following the execution of the hardware update sends the group index and rule bitmap to SMD 116. In some examples, SMD 116 rather than the microkernel of PFE 90 programs the rules into forwarding ASICs 108. In such examples a pass path comprising a logical connection exists between service PIC 114 and PFE 90. SMD 116 sends instructions, including the rule bitmap and group index, to PFE 90 that cause PFE 90 to load the rules into forwarding ASICs 108.

Figure 5:
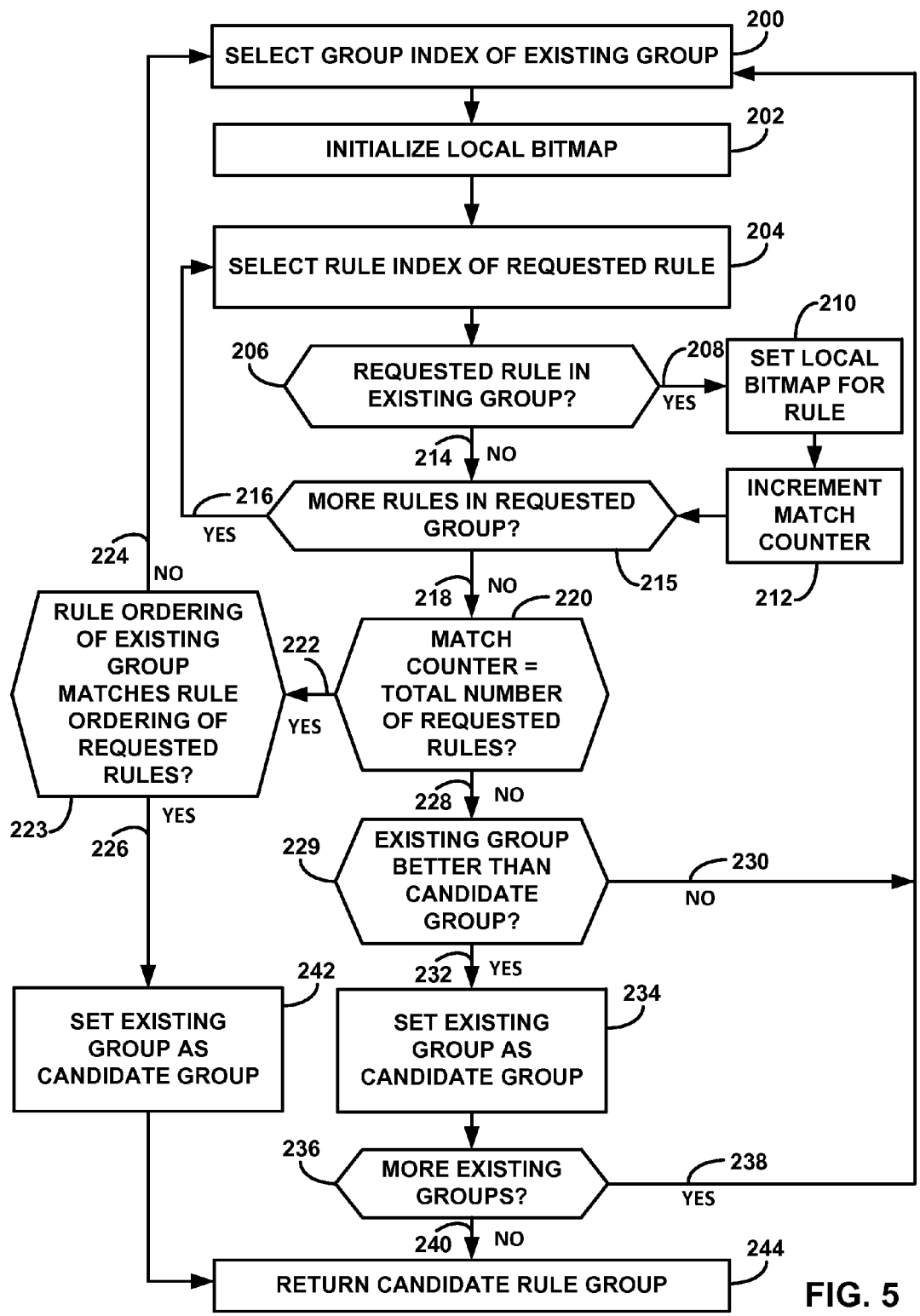
FIG. 5 is a flow diagram illustrating an example method to query existing rule groups in order to select a candidate rule group, in accordance with the techniques of this disclosure.

FIG. 5 is a flow diagram illustrating an example method to query existing rule groups in order to select a candidate rule group. The example method of FIG. 5 walks the list of existing rule groups in group datastore 106 to identify a candidate rule group. Group datastore 106 may be implemented such that existing rule groups with greater quantities of rules are evaluated by TFT manager 96 before existing rule groups with fewer quantities of rules. By storing the rule groups in descending order of cardinality, TFT manager 96 may use bitmatrix 102 to quickly identify rule groups that include rules matching the requested rules rather than searching all the members of each group in group datastore 106 for a candidate rule group.

Initially, TFT manager 96 selects the first rule group ("existing rule group") of group datastore 106 and further selects the group index of the existing rule group (200). TFT manager 96 also initializes a local bitmap that will be used by TFT manager 96 to determine if the selected existing rule group is usable as the candidate rule group (202). TFT manager 96 then selects the rule index of the first rule included in the existing rule group (204). Using the rule index and group index, TFT manager 96 determines in bit matrix 102 if the requested rule is included in the existing rule group (206). For instance, TFT manager 96 uses the rule index and group index to determine if bit matrix 102 indicates a value of '1' at row/column intersection defined by the rule index and group index. A value of '1' indicates the existing rule group includes the requested rule. If the existing rule group includes the requested rule, TFT manager 96 assigns a value of '1' to the index of the local bitmap that corresponds to the index of the requested rule in bit matrix 102 (208). TFT manager 96 further increments a match counter that is created by TFT manager 96 to track the quantity of rules in the existing rule group that match the requested rules (212).

TFT manager 96 subsequently determines whether the requested rule group includes more requested rules (215). If more requested rules exist in the requested rule group (216), TFT manager 96 selects the rule index of the next requested rule and proceeds to perform elements 206-216 as previously described. If no more requested rules exist in the requested rule group (218), TFT manager 96 next determines if the match counter is non-zero, which indicates the selected existing rule group includes at least one rule that matches a requested rule. If the match counter is zero, TFT manager 96 proceeds to select the group index of the next rule group stored in group datastore 106.

If the match counter is non-zero, TFT manager 96 determines if the match counter equals the quantity of requested rules (220). If the match counter equals the quantity of requested rules (222), TFT manager 96 determines if the rule ordering of the requested rules matches the rule ordering of the rules in the existing rule group (223). If the rule ordering does not match (224), the selected existing rule group may not be usable and consequently, TFT manager 96 selects the group index of the next group in group datastore 106. If the rule ordering does match, the selected existing rule group is either an exact set or a superset of the requested rule group (226). In such examples, the selected existing group is set as the candidate rule group (234) and TFT manager 96 returns the candidate rule group (244). TFT manager 96 then further determines if the candidate rule group is an exact set or superset as described beginning at element 162 of FIG. 4.

Figure 6:
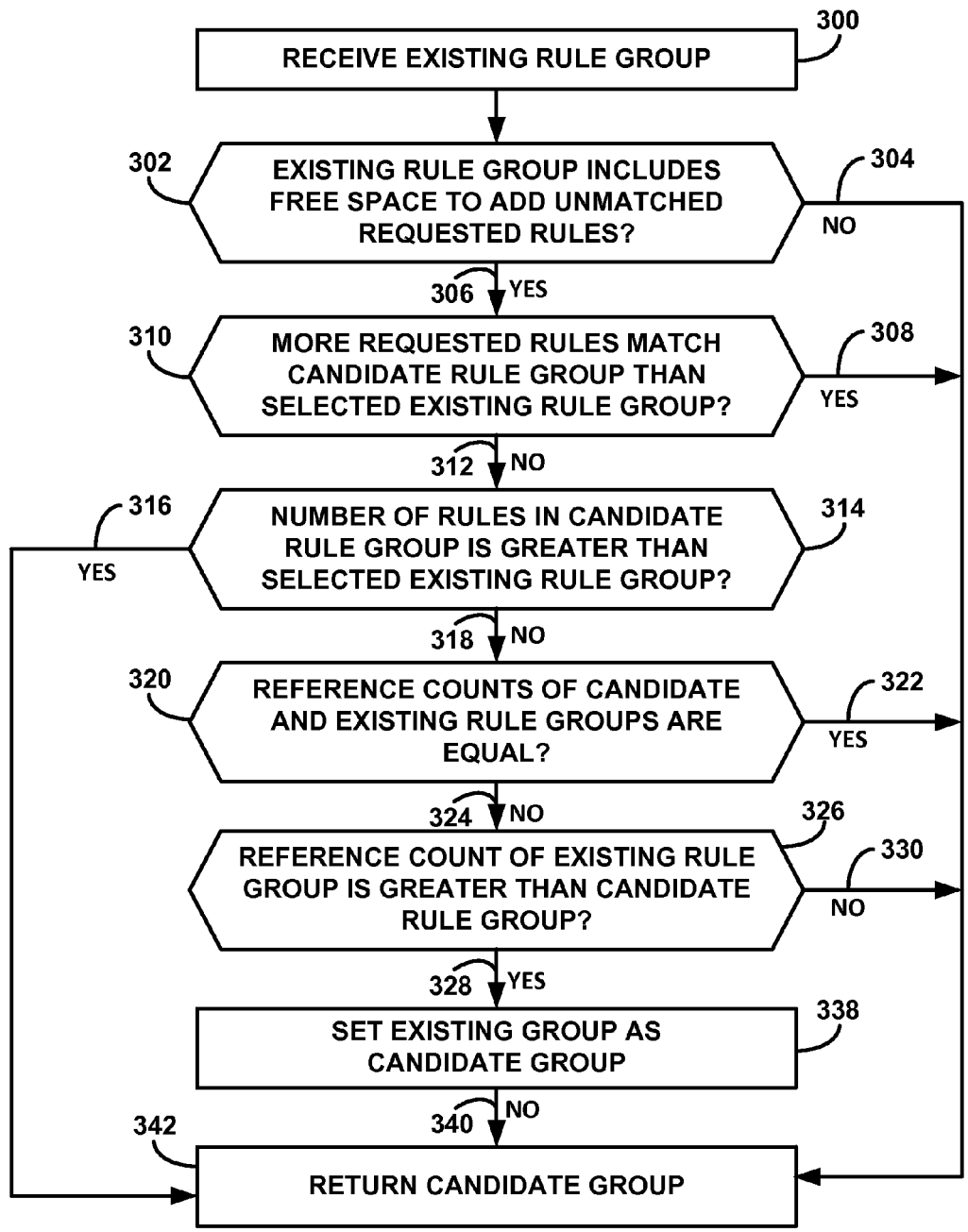
FIG. 6 is a flow diagram illustrating an example method to determine if an existing rule group is better than candidate rule group, in accordance with the techniques of this disclosure.

In some examples, the match counter may not equal the total number of requested rules (228). In such examples, the selected existing group is a subset of the requested rule group. As previously described, an existing rule group comprising a subset of the requested rules may be used as a candidate rule group by adding any unmatched requested rules to the existing rule group. When TFT manager 96 determines the selected existing rule group is a subset of the requested rule group TFT manager 96 may further determine whether the existing rule group is a better than the rule group currently set as the candidate rule group (229). FIG. 6 illustrates an example method to determine if the existing rule group is better than the candidate rule group. If the existing rule group is not better than the candidate rule group (230), TFT manager 96 selects the group index of the next group in group datastore 106.

If the existing rule group is better than the candidate rule group (232), TFT manager 96 sets the existing rule group as the candidate rule group (234). TFT manager 96 then determines if more existing groups are present in group datastore 106 (236). TFT manager 96 searches for more existing rule groups in order to determine if another existing group is superior to the candidate group. If TFT manager 96 determines more existing groups are present in group datastore 106, TFT manager 96 selects the group index of the next existing group (238). If no existing groups are present (240), TFT manager 96 will return the candidate rule group (244).

FIG. 6 is a flow diagram illustrating an example method to determine if an existing rule group is better than candidate rule group. The example method of FIG. 6 illustrates element 229 of FIG. 5 in greater detail. In FIG. 5 at element 229, TFT manager 96 has selected the existing rule group to determine if the existing rule group may be set as the candidate rule group. TFT manager 96 has further determined that the selected existing rule group is a subset of the requested rule group. Additionally, the candidate rule group indicated at element 229 of FIG. 5 may presently be set to a rule group in group datastore 106 that is different from the existing rule group currently selected by TFT manager 96 in FIG. 6. FIG. 6 provides an example method to determine if the selected existing rule group is better than the candidate rule group.

To determine if the selected existing rule group is better than the candidate rule, TFT manager 96 initially receives the existing rule group associated with the group index of element 200 as shown in FIG. 5 (300). Because the existing rule group is a subset of the requested rule group, TFT manager 96 determines whether the existing rule group includes free space to add unmatched requested rules to the existing rule group. TFT manager 96 may compare the free space counter value of the existing rule group with size threshold imposed by TFT manager 96. The size threshold may be set by TFT manager 96 based on resource limitations or the architecture of PFE 90. If insufficient free space exists to store the unmatched requested rules (304), the candidate rule group remains unchanged and is returned (342).

If the existing rule group includes sufficient free space (306), TFT manager 96 determines whether a greater number of requested rules match the candidate rule group than the selected existing rule group (310). If a greater number of requested rules match the candidate rule group, TFT manager 96 (308), TFT manager 96 returns the candidate rule group (342). If the candidate rule group does not include a greater number of requested rules (312), TFT Manger 96 determines whether a number of rules in the candidate rule group is greater than the selected existing rule group. (314). If the number of rules in the candidate rule group is greater than the selected existing rule group (316), TFT manager 96 sets the selected existing group as the candidate rule group (338). If the number of rules in the candidate rule group is not greater than the selected existing rule group (324), the number of requested rules matching the candidate rule group and selected existing rule group are equal.

When the number of requested rules matching the candidate rule group and selected existing rule group are equal, TFT manager 96 determines if a reference count of the candidate rule group is equal to a reference count of the existing rule group. A reference count of a group indicates the number of times a rule group in group datastore 106 has been used by TFT manager 96 to service a request from SMD 116 to load rules into forwarding ASICs 108. If the reference counts of each rule group are equal (322), TFT manager 96 returns the candidate rule group (342). If the reference counts are not equal (324), TFT manager 96 determines if the reference count of the existing rule group is greater than the reference count of the candidate rule group (326), If so (328), TFT manager 96 sets the existing rule group as the candidate rule group (338). If the reference count of the existing rule group is less than the reference count of the candidate rule group (330), TFT manager 96 returns the candidate group (324). The example methods of FIGS. 4-6 are further usable by TFT manager 96 without modification to add rules to existing rule groups and to update rule positions within the existing rule groups.

Figure 7:
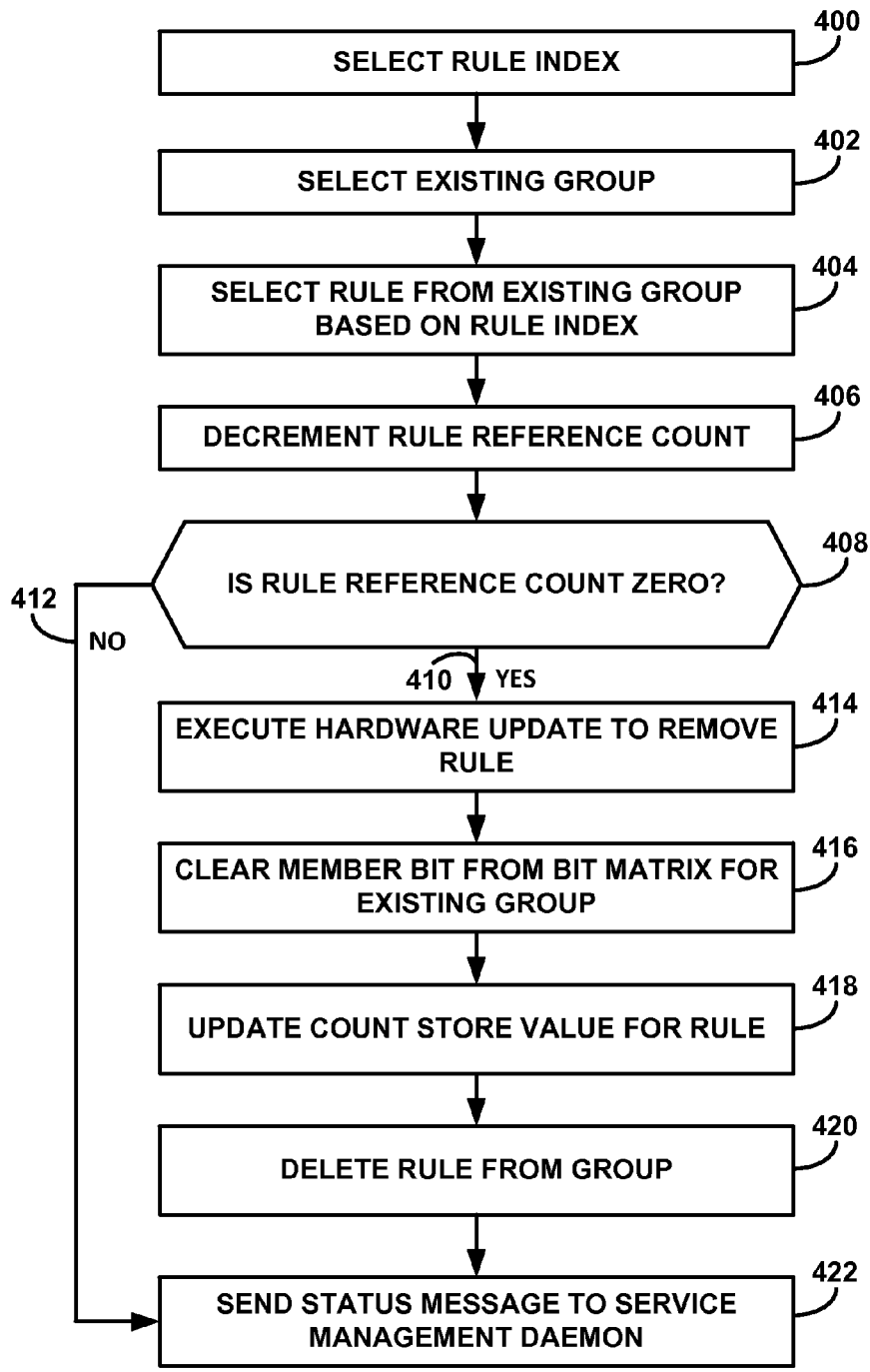
FIG. 7. is a flow diagram illustrating an example method to remove rules from existing rule groups programmed in a packet forwarding engine, in accordance with the techniques of this disclosure.

FIG. 7 illustrates an example method to remove rules from existing rule groups programmed on PFE 90. In FIG. 7, TFT manager 96 may initially receive a message to delete one or more rules from SMD 116, e.g., if a user disconnects from the core network. The message may include one or more rule identifiers of the rules such as hashes generated by SMD 116. The message may further include a group index that of the group that includes the one or more rules to be deleted. TFT manager 96 query rule manager 132 to select a rule index associated with the rule identifier (300). TFT manager 96 further selects the existing rule group from group datastore 106 that includes the rule to be deleted (302). Upon selecting the existing rule group, TFT manager 96 selects the rule to be deleted from the group using the rule index (304). TFT manager 96 subsequently decrements the reference count value stored in the rule (306). TFT manager 96 further determines if the reference count of the rule is zero (308). If the reference count is not zero, TFT manager 96 sends a status message to the SMD 116 indicating the rule was deleted.

If the rule reference count is zero (308), TFT manager 96 executes a hardware update to remove the rule from filtering ASICs 108 (314). TFT manager 96 further sets the bit corresponding to the deleted rule in bit matrix 102 to '0' to indicate the rule has been deleted from the rule group (316). For example, the bit at the intersection of the deleted rule and the rule group that included the deleted rule is set to '0'. TFT manager 96 further decrements the value in countstore 100 that corresponds to the deleted rule (318). TFT manager 96 also deletes the rule from group datastore (106). Finally, TFT manager 96 sends a status message to SMD 116 indicating the rule has been deleted.

Figure 8:
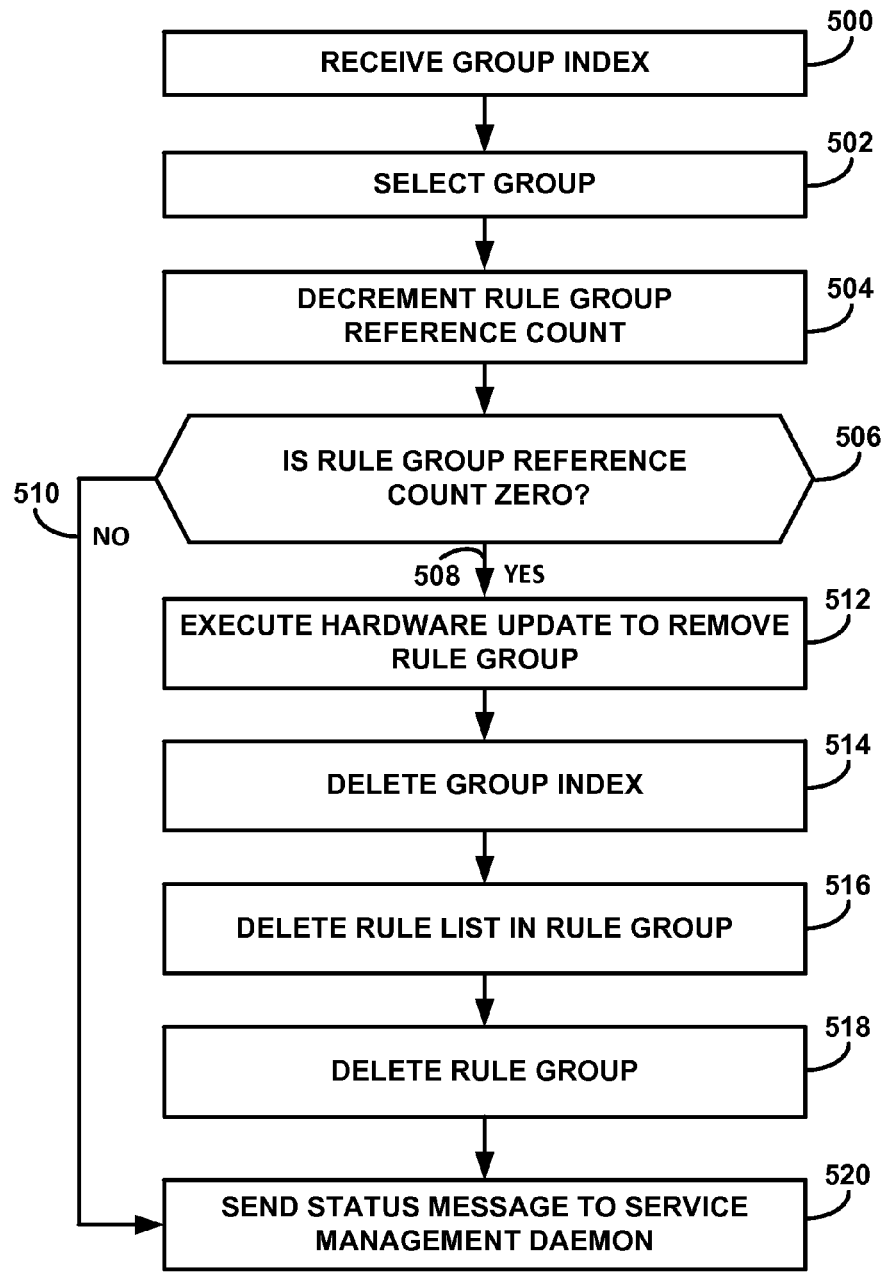
FIG. 8 is a flow diagram illustrating an example method to remove existing rule groups programmed in a packet forwarding engine, in accordance with the techniques of this disclosure.

FIG. 8 illustrates an example method to remove existing rule groups programmed in PFE 90. In FIG. 8, TFT manager 96 may initially receive a message to delete a rule group from SMD 116, e.g., if a user disconnects from the core network. The message includes include a group index that of the rule group to be deleted (500). TFT manager 96 further selects the existing rule group from group datastore 106 to be deleted (502). Upon selecting the existing rule group, TFT manager 96 subsequently decrements the reference count value stored in the rule group (504). TFT manager 96 further determines if the reference count of the rule group is zero (506). If the reference count is not zero, TFT manager 96 sends a status message to the SMD 116 indicating the rule group was deleted.

If the rule reference count is zero (510), TFT manager 96 executes a hardware update to remove the rules of the rule group from filtering ASICs 108 (512). TFT manager 96 further deletes the group index from group index table 104 (514).

TFT manager 96 also deletes the rule list included in the rule group (516). After deleting the rule list, TFT manager 96 deletes the rule group object from group datastore 106 (518). Finally, TFT manager 96 sends a status message to SMD 116 indicating the rule group has been deleted.

Various embodiments of the invention have been described. These and other embodiments are within the scope of the following claims.

The invention claimed is:

1. A method comprising:
receiving, by a computing device, a network access request from a first user;
querying a data structure that indicates one or more associations between an existing rule group and one or more existing rules that are currently deployed within a forwarding plane of the computing device to select, by the computing device, a candidate rule group associated with a packet flow, wherein the candidate rule group references one or more of the one or more existing rules that are being applied by the forwarding plane of the computing device to network traffic associated with a second user;
installing, by the computing device and based on the candidate rule group, a new rule group that includes references to one or more of the one or more existing rules of the candidate rule group and one or more new rules associated with the first user and not currently installed within the forwarding plane of the computing device;
installing, by the computing device, the one or more new rules associated with the first user within the forwarding plane of the computing device; and
applying, by the computing device, each rule of the new rule group to network traffic associated with the first user, wherein applying each rule of the new rule group includes applying the one or more new rules of the new rule group and the one or more existing rules referenced by the new rule group that are being applied by the forwarding plane to the network traffic associated with the second user.

2. The method of claim 1, wherein the data structure comprises a bit matrix, and
wherein one or more requested rules of a requested rule group comprise rules of the new rule group.

3. The method of claim 2,
wherein the bit matrix comprises a two-dimensional array comprising two or more elements,
wherein a row of the bit matrix is associated with an existing rule of the one or more existing rules, and
wherein a column of the bit matrix is associated with the existing rule group of one or more existing rule groups.

4. The method of claim 3,
wherein a bit stored in an element of the two-dimensional array identified by a rule index associated with the existing rule and a column index associated with the existing rule group indicates the existing rule is included in the existing rule group.

5. The method of claim 2, wherein querying the data structure comprising the bit matrix further comprises:
selecting, by the computing device, the existing rule group;
selecting, by the computing device, bits of the bit matrix associated with the existing rule group, wherein each bit of the selected bits is associated with one of the one or more requested rules, wherein each bit of the selected bits indicates whether each of the one or more requested rules is included in the existing rule group; and
based on the one or more bits, determining, by the computing device, if each of the one or more requested rules are included in the existing rule group.

6. The method of claim 2, wherein each requested rule of the one or more requested rules comprises one or more filters.

7. The method of claim 2, wherein existing rule groups are stored in a group datastore, and wherein each existing rule group group of one or more existing rule groups in the group datastore is identifiable by a group index.

8. The method of claim 2, further comprising:
responsive to determining that each of the one or more requested rules matches at least one rule of the existing rule group,
assigning, by the computing device, the existing rule group as the candidate rule group.

9. The method of claim 2, wherein the bit matrix is a first bit matrix, the method further comprising:
determining, by the computing device, the existing rule group comprises a superset of the requested rule group;
selecting, by the computing device, the existing rule group as the candidate rule group; and
generating, by the computing device, a second bit matrix that indicates the positions of the one or more requested rules within the candidate rule group.

10. The method of claim 2, wherein the bit matrix is a first bit matrix, the method further comprising:
determining, by the computing device, the existing rule group comprises a subset of the requested rule group, wherein at least one of the one or more requested rules is not included the existing rule group;
selecting, by the computing device, the existing rule group as the candidate rule group; and
generating, by the computing device, a second bit matrix that indicates the positions of the one or more requested rules within the candidate rule group.

11. The method of claim 10, further comprising:
determining, by the computing device, the existing rule group is capable of storing the at least one of the one or more requested rules; and
storing, by the computing device, the at least one of the one or more requested rules in the existing rule group.

12. The method of claim 10, wherein selecting the existing rule group as the candidate rule group further comprises:
determining, by the computing device, if the existing rule group includes a greater quantity, fewer quantity, or exact quantity of the one or more requested rules than the candidate rule group.

13. The method of claim 10, wherein selecting the existing rule group as the candidate rule group further comprises:
determining, by the computing device, if a first reference count of the existing rule group is greater, less than or equal to a second reference count of the candidate rule group.

14. The method of claim 2, wherein querying the data structure comprising the bit matrix further comprises:
selecting, by the computing device, the existing rule group from existing rule groups; and
determining, by the computing device, if each requested rule of the requested rule group is included in the existing rule group.

15. The method of claim 13, wherein if each requested rule of the requested rule group is included in the existing rule group:
determining, by the computing device, if a first ordering of the one or more requested rules in the requested rule group is equal to a second ordering of the one or more requested rules in the existing rule group.

16. The method of claim 2, further comprising:

receiving, by the computing device, a message to delete a rule from an existing rule group;

selecting, by the computing device, the existing rule group that includes the rule;

decrementing, by the computing device, a reference count of the rule;

determining, by the computing device, the reference count of the rule is zero;

removing, by the computing device, the rule from one or more integrated circuits of the computing device;

clearing, by the computing device, a bit in the bit matrix that indicates the rule is included in the existing rule group; and removing, by the computing device, the rule from the existing rule group.

17. The method of claim 2, further comprising:

receiving, by the computing device, a message to delete an existing rule group;

selecting, by the computing device, the existing rule group;

decrementing, by the computing device, a reference count of the existing rule group;

determining, by the computing device, the reference count of the existing rule group is zero;

removing, by the computing device, the existing rule group from one or more integrated circuits of the computing device; and removing, by the computing device, the existing rule group from a group datastore that includes existing rule groups.

18. A network device comprising:

one or more network interfaces to receive a network access request from a first user;

a packet forwarding engine comprising hardware configured to execute a manager module that detects a packet flow, wherein the manager module queries a data structure that indicates one or more associations between an existing rule group and one or more existing rules that are currently deployed within a forwarding plane of the network device to select a candidate rule group associated with the packet flow, wherein the candidate rule group references one or more of the one or more existing rules that are being applied by the forwarding plane of the computing device to network traffic associated with a second user;

wherein the manager module installs a new rule group, based on the candidate rule group, that includes references to one or more of the one or more existing rules of the candidate rule group and one or more new rules associated with the first user and not currently installed within the forwarding plane of the computing device;

wherein the manager module installs the one or more new rules associated with the first user within the forwarding plane of the computing device; and wherein the manager module applies each rule of the new rule group to network traffic associated with the first user, wherein applying each rule of the new rule group includes applying the one or more new rules of the new rule group and the one or more existing rules referenced by the new rule group that are being applied by the forwarding plane to the network traffic associated with the second user.

19. The network device of claim 18, wherein the data structure comprises a bit matrix;

wherein the manager module receives a request for a requested rule group comprising one or more requested rules;

wherein the candidate rule group includes at least one of the one or more requested rules of the requested rule group.

20. The network device of claim 19, wherein the bit matrix comprises a two-dimensional array comprising two or more elements, wherein a row of the bit matrix is associated with an existing rule of the one or more existing rules, and wherein a column of the bit matrix is associated with the existing rule group of one or more existing rule groups.

21. The network device of claim 20, wherein a bit stored in an element of the two-dimensional array identified by a rule index associated with the existing rule and a column index associated with the existing rule group indicates the existing rule is included in the existing rule group.

22. The network device of claim 19, wherein the manager module selects the existing rule group;

wherein the manager module selects bits of the bit matrix associated with the existing rule group, wherein each bit of the selected bits is associated with one of the one or more requested rules, wherein each bit of the selected bits indicates whether each of the one or more requested rules is included in the existing rule group; and wherein based on the one or more bits, the manager module determines if each of the one or more requested rules are included in the existing rule group.

23. The network device of claim 19, wherein each requested rule of the one or more requested rules comprises one or more filters.

24. The network device of claim 19, wherein the existing rule groups are stored in a group datastore, and wherein each existing group of one or more existing rule groups in the group datastore is identifiable by a group index.

25. The network device of claim 19, wherein responsive to determining that each of the one or more requested rules matches at least one rule of the existing rule group the manager module assigns the existing rule group as the candidate rule group.

26. The network device of claim 19, wherein the bit matrix is a first bit matrix;

wherein the manager module determines the existing rule group comprises a superset of the requested rule group;

wherein the manager module selects the existing rule group as the candidate rule group; and wherein the manager module generates a second bit matrix that indicates the positions of the one or more requested rules within the candidate rule group.

27. The network device of claim 26, wherein the manager module determines the existing rule group is capable of storing the at least one of the one or more requested rules; and wherein the manager module stores the at least one of the one or more requested rules in the existing rule group.

28. The network device of claim 26, wherein the manager module determines if the existing rule group includes a greater quantity, fewer quantity, or exact quantity of the one or more requested rules than the candidate rule group.

29. The network device of claim 26,
wherein the manager module determines if a first reference count of the existing rule group is greater, less than or equal to a second reference count of the candidate rule group.

30. The network device of claim 19,
wherein the manager module selects the existing rule group from existing rule groups; and
wherein the manager module determines if each requested rule of the requested rule group is included in the existing rule group.

31. The network device of claim 29,
wherein the manager module determines if a first ordering of the one or more requested rules in the requested rule group is equal to a second ordering of the one or more requested rules in the existing rule group.

32. The network device of claim 19,
wherein the manager module receives a message to delete a rule from an existing rule group;
wherein the manager module selects the existing rule group that includes the rule;
wherein the manager module decrements a reference count of the rule;
wherein the manager module determines the reference count of the rule is zero;
wherein the manager module removes the rule from one or more integrated circuits of the network device;
wherein the manager module clears a bit in the bit matrix that indicates the rule is included in the existing rule group; and
wherein the manager module removes the rule from the existing rule group.

33. The network device of claim 19,
wherein the manager module receives a message to delete an existing rule group;
wherein the manager module selects the existing rule group;
wherein the manager module decrements a reference count of the existing rule group;
wherein the manager module determines the reference count of the existing rule group is zero;
wherein the manager module removes the existing rule group from one or more integrated circuits of the network device; and
wherein the manager module removes the existing rule group from a group datastore that includes existing rule groups.

* * * * *